(12) United States Patent
Lorenz (10) Patent No.: US 11,325,693 B2
(45) Date of Patent: May 10, 2022

(54) ACTUATION UNIT FOR ACTUATING A FOLDABLE WING TIP PORTION OF A WING FOR AN AIRCRAFT

(71) Applicant: Airbus Operations GmbH, Hamburg (DE)

(72) Inventor: Christian Lorenz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 171 days.

(21) Appl. No.: 16/639,864

(22) PCT Filed: Aug. 1, 2018

(86) PCT No.: PCT/EP2018/070918
§ 371 (c)(1),
(2) Date: Feb. 18, 2020

(87) PCT Pub. No.: WO2019/034432
PCT Pub. Date: Feb. 21, 2019

(65) Prior Publication Data
US 2020/0361596 A1    Nov. 19, 2020

(30) Foreign Application Priority Data
Aug. 18, 2017   (DE) ..................... 10 2017 118 976.9

(51) Int. Cl.
*B64C 13/34*    (2006.01)
*B64C 3/56*     (2006.01)
*B64C 13/50*    (2006.01)

(52) U.S. Cl.
CPC .............. *B64C 13/34* (2013.01); *B64C 3/56* (2013.01); *B64C 13/50* (2013.01)

(58) Field of Classification Search
CPC ........... B64C 13/34; B64C 13/50; B64C 3/56; B64C 2201/102
See application file for complete search history.

(56) References Cited

U.S. PATENT DOCUMENTS

| 1,772,405 A | 8/1930 | Wargo |
| 1,879,821 A | 9/1932 | Peterson |

(Continued)

FOREIGN PATENT DOCUMENTS

| EP | 2 730 499 | 5/2014 | |
| EP | 3524514 A1 * | 8/2019 | ............. F16H 19/04 |

(Continued)

OTHER PUBLICATIONS

International Search Report for PCT/EP2018/070918 dated Oct. 10, 2018, 5 pages.

(Continued)

*Primary Examiner* — Rodney A Bonnette
(74) *Attorney, Agent, or Firm* — Nixon & Vanderhye P.C.

(57) ABSTRACT

An actuation unit (15) for actuating a foldable wing tip portion (9) includes a first housing part (19) including a first attachment device (23) configured for attachment to a fixed wing (5), and a second housing part (21) including a second attachment device (25) configured for attachment to a foldable wing tip portion (9). The second housing part (21) is rotatable about a main axis of rotation (35). The second housing part (21) includes a toothed rack (37) having a concave shape and facing the main axis of rotation (35). A drive pinion (39) is supported at the first housing part (19) and engaging the toothed rack (37) for driving the second housing part (21) rotatingly relative to the first housing part (19). The drive pinion (39) is driven by a coupling arrangement (43) that is configured to be coupled to an output (45) of a motor unit (47).

19 Claims, 9 Drawing Sheets

(56) References Cited

U.S. PATENT DOCUMENTS

| | | | |
|---|---|---|---|
| 5,039,032 A | 8/1991 | Rudolph | |
| 9,415,857 B2 | 8/2016 | Fox et al. | |
| 2013/0313356 A1* | 11/2013 | Santini | B64C 3/56 |
| | | | 244/49 |
| 2017/0183093 A1* | 6/2017 | Bialek | B64C 11/00 |
| 2019/0315454 A1* | 10/2019 | Fox | B64C 13/34 |
| 2019/0367153 A1* | 12/2019 | Bishop | B64C 23/072 |

FOREIGN PATENT DOCUMENTS

| | | | |
|---|---|---|---|
| GB | 2583959 A * | 11/2020 | B64C 3/56 |
| WO | 2011/066031 | 6/2011 | |
| WO | 2015/179122 | 11/2015 | |
| WO | WO-2020254560 A1 * | 12/2020 | B64C 23/072 |

OTHER PUBLICATIONS

Written Opinion of the ISA for PCT/EP2018/070918 dated Oct. 10, 2018, 7 pages.
German Search Report for DE102017118976.9 dated Apr. 17, 2018, 7 pages.
Russian Office Action with Translation cited in 2020111015, dated Jun. 18, 2020, 7 pages.
Russian Search Report with Translation cited in 2020111015, dated Jun. 16, 2020, 4 pages.

* cited by examiner

ACTUATION UNIT FOR ACTUATING A FOLDABLE WING TIP PORTION OF A WING FOR AN AIRCRAFT

RELATED APPLICATIONS

This application is the U.S. national phase of International Application PCT/EP2018/070918 filed Aug. 1, 2018, which designated the U.S. and claims priority to German Patent Application DE 10 2017 118 976.9 filed Aug. 18, 2017, the entire contents of each of which are hereby incorporated by reference.

BACKGROUND AND SUMMARY OF INVENTION

The present invention relates to an actuation unit for actuating a movable wing surface, in particular a foldable wing tip portion, of a wing for an aircraft. Such a wing comprises a fixed wing and a wing tip portion mounted to the fixed wing in a foldable manner. Specifically, the wing tip portion is foldable upwards about an axis extending in a horizontal plane or in parallel to a chord line or in parallel to the wing surface. Further aspects of the present invention relate to a wing comprising the actuation unit as well as an aircraft comprising the wing.

Foldable wings are developed in order to reduce the space requirements of an aircraft during maneuver and parking on ground. As soon as the aircraft has landed the wing tip portions of the wing are folded upwards, thereby reducing the overall span of the aircraft.

Actuation units for actuating movable parts of the wing, such as slats, are known in the art. Such units commonly apply a rack and pinion drive. However, little available space at the wing tips and at the same time high torque requirements for the actuation of the wing tip portion do not allow to employ an actuation unit similar to the ones for moving slats or flaps of a known wing.

Accordingly, the object of the present invention is to provide a highly compact and strong actuation unit.

This object is achieved in that the actuation unit comprises a first housing part and a second housing part. The first housing part includes a first attachment device configured for attaching the actuation unit to a fixed wing for an aircraft. The second housing part includes a second attachment device configured for attaching the actuation unit to a wing tip portion foldably mounted to the fixed wing. The second housing part is connected to the first housing part such that it is rotatable relative to the first housing part about a main axis of rotation. The second housing part includes a toothed rack having a concave shape and facing the main axis of rotation. The toothed rack is preferably fixedly mounted to the second housing part or integrally formed therein. The actuation unit further comprises a drive pinion supported at the first housing part and engaging the toothed rack for driving the second housing part rotatingly relative to the first housing part. A pinion axis of rotation of the drive pinion is preferably spaced apart from and in parallel to main axis of rotation. The drive pinion is driven by a coupling arrangement that is configured to be coupled to an output of a motor unit.

Such an actuation unit provides a compact construction that allows it to be installed in the limited space along the hinge axis between the fixed wing and the foldable wing tip portion.

Preferably, the second housing part proceeds around a portion of the first housing part in the form of a rotatable ring that is either closed over 360° or might be opened over a certain angular range along its circumference, such as over 90°, 180° or 270°.

According to a preferred embodiment, the main axis of rotation proceeds within a cross sectional extension of the actuation unit, when viewed across the main axis of rotation. In other words, the main axis of rotation intersects the actuation unit or proceeds inside of the outer boundary or contour of the actuation unit, when viewed in a cross section across the main axis of rotation. In such a way, a particularly compact construction is enabled.

According to another preferred embodiment, the coupling arrangement includes an offset gear that drives the pinion by engaging the pinion at a position spaced apart from the toothed rack. Preferably, an offset gear axis of rotation of the offset gear is spaced apart from and in parallel to the main axis of rotation and to the pinion axis of rotation. By including such an offset gear a particularly compact construction of the actuation unit can be obtained.

According to yet another preferred embodiment, the coupling arrangement includes a gear assembly configured to reduce rotational speed and increase torque in a direction from the motor unit to the pinion. By including such a gear assembly a downsized motor unit can be employed that generates less torque and, thus, requires less space and weight.

In particular, it is preferred that the gear assembly is arranged in line with the offset gear, i.e. along the offset gear axis of rotation. In such a way, a particularly compact actuation unit is obtained.

Further, it is preferred that the gear assembly comprises a number of reduction stages reducing rotational speed and increasing torque, and at least one power stage further reducing rotational speed, increasing torque and being formed particularly stiff and strong for transferring the high torque to the offset gear. Such a gear assembly allows an efficient torque transfer with a downsized motor unit.

It is further preferred that the reduction stages are arranged on one side and the power stage is arranged on the opposite side of the offset gear, when viewed along the offset gear axis of rotation. The reduction stages are coupled to the power stage by a drive through shaft that axially proceeds through the offset gear without being coupled to the offset gear. The power stage is separately coupled to the offset gear, preferably by a coaxial shaft arranged coaxially with respect to the drive through shaft. In such a way, the offset gear is arranged in between the stages of the gear assembly, thereby allowing for a particularly compact and efficient design of the actuation unit.

According to another preferred embodiment, the gear assembly comprises a connection gear stage configured for connecting the output of the motor unit to the reduction stages when the output is not aligned with the reduction stages. In such a way, the motor unit can be arranged parallelly, and spaced apart, from the gear assembly or perpendicular to the gear assembly, such that the arrangement of actuation unit and motor unit requires less space in the axial direction.

In a preferred embodiment, the first housing part and the second housing part together enclose an interior space. The interior space is preferable sealed to the environment. The drive pinion and preferably also the offset gear are arranged inside the interior space. In such a way the toothed rack and drive pinion, and preferably also the offset gear, are protected from environmental contamination, such as dust, insects, birds, etc., so that the teeth of the toothed rack, the drive pinion and the offset gear can be formed with minimal tolerances and a high torque can be transferred.

In particular, it is preferred that a lubricant is provided inside the interior space to lubricate the toothed rack, the drive pinion and preferably the offset gear. Preferably, sealing lips are provided between the first and second housing parts in order to seal the interior space and keep the lubricant from leaking. In such a manner, the teeth of the toothed rack, the drive pinion and the offset gear can be lubricated without requiring a specific lubrication system or lubricant container.

It is also preferred that the second housing part includes a cover that is movable, in particular pivotable, between a closed position where the interior space is closed to the surrounding, and an opened position where the interior space is opened to the surrounding. By such a movable cover, the interior space can be accessed from the outside, e.g. for maintenance purposes. However, the cover might also be unmovable and fixed in the closed position, or it might be generally movable but is or can be fixed in the closed position in such a way that the cover might transfer loads, e.g. by rivets. A load bearing cover leads to further weight reduction of the second housing part and, thus, of the entire actuation unit.

It is further preferred that the first housing part forms a circumferential first case around the reduction stages and a circumferential second case around the power stage of the gear assembly. The second housing part preferably extends in the form of rotatable ring between the first case and the second case. The ring might be closed over 360° or might be opened over a certain angular range along the circumference. The first case and the second case are connected to one another by a connection structure transferring loads and torque between the first and second cases. The connection structure is arranged inside the interior space and radially surrounded by the second housing part. The connection structure is preferably formed as a curved shell part extending in parallel to the main axis of rotation and partially surrounding the offset gear. Preferably, the first case and the second case are further connected to one another by a structure bridge extending radially outwards to the second housing part. The structure bridge also serves to transfer loads between the first and second cases, and the first attachment device is mounted to the structure bridge. Preferably, rollers are mounted to the outside of the first housing part and engaging the surface of the second housing part for providing a defined and smooth path of movement for the second housing part relative to the first housing part.

According to a preferred embodiment, the toothed rack is curved around the main axis of rotation by an angle of at least 90°, preferably of between 90° and 180°, further preferred of between 90° and 100°, most preferred of 94°. In such a way, the wing tip portion can be folded upwards by 90° with 2° overtravel at both ends.

According to another preferred embodiment, the first attachment device comprises one or more spherical joints, preferably three spherical joints that are fixedly mounted to the first housing part, preferably to the structure bridge, by brackets. Additionally or alternatively, the first attachment device might also comprise one or more attachment links having two or more bores and being secured to the first housing part and to the fixed wing by bolts extending through the bores. The attachment links might be plate-shaped and arranged on opposite sides of the first housing part. Preferably, the attachment links are in the form of a Y and have three bores, wherein each bore is provided in one lateral end of the Y-shaped structure of the attachment link. One of the bores is bolted to the first housing part while the other two bores are bolted to the fixed wing. In addition to the attachment links the first attachment device might comprise one or more rods bolted to both the first housing part and the fixed wing preferably in a position radially spaced apart from the bolts connecting the attachment links to the first housing part. In such a way, a very strong first attachment device is provided that requires only minimum space.

It is further preferred that the second attachment device comprises one or more spherical joints, preferably one spherical joint that is fixedly mounted to the second housing part by brackets, preferably opposite the structure bridge. By employing spherical joints an attachment of the actuation unit free of constraint forces is obtained.

A further aspect of the present invention relates to a wing for an aircraft. The wing comprises a fixed wing, a foldable wing tip portion mounted to the fixed wing via hinges rotatable about a hinge axis, and an actuation unit according to any of afore described embodiments. The actuation unit is attached to the fixed wing via the first attachment device. The actuation unit is attached to the wing tip portion via the second attachment device. The hinge axis coincides with the main axis of rotation of the actuation unit. The actuation unit is preferably positioned on the main axis of rotation between two neighboring hinges. The wing further comprises a motor unit, preferably an electric motor or a hydraulic motor, that has an output coupled to the coupling arrangement for driving the drive pinion. Features and advantages mentioned further above in connection with the actuation unit also apply for the wing.

According to a preferred embodiment, the connection gear stage connects the output of the motor unit to the reduction stages. Preferably, the motor unit is arranged such that the output extends parallelly, and spaced apart, from the reduction stages. Alternatively, it is preferred that the motor unit is arranged such that the output extends perpendicularly to the reduction stages. Both alternatives allow to reduce the space requirements of the actuation unit and motor unit between the hinges.

A yet further aspect of the present invention relates to an aircraft comprising a wing according to any of the afore-described embodiments. Features and advantages mentioned further above in connection with the actuation unit and the wing also apply for the aircraft.

The actuation unit according to the invention might also be configured and employed for actuating a high lift system of a wing for an aircraft. The movable wing surface would then be a slat or a flap, in particular a trailing edge flap. The actuation unit would connect the slat or the flap to a fixed wing. Specifically, the second attachment device would be attached or configured to be attached to the slat or flap, while the first attachment device would be attached or configured to be attached to the fixed wing. The remaining features of the actuation unit would correspond to the actuation unit configured for actuating the movable wing tip portion as described above.

SUMMARY OF DRAWINGS

Hereinafter, the present invention is described in more detail by means of a drawing. The drawing shows in FIG. 1 a perspective view of an aircraft according to the invention, FIG. 2 a perspective view of a wing of the aircraft of FIG. 1, where a wing tip portion is movably mounted to a fixed wing via hinges and an actuation unit according to the invention, FIG. 3 a top view of the wing of FIG. 2, FIG. 4 a detailed perspective view of the actuation unit of FIG. 2, FIG. 5 a detailed top view of the actuation unit of FIG. 2, FIG. 6 another detailed perspective view of the actuation unit of FIG. 2, FIG. 7 another detailed perspective view of the actuation unit of FIG. 2 with a cut open interior space, FIG. 8 a schematic cross sectional view across a main axis of rotation of the actuation unit of FIG. 2 at the interior space, FIG. 9 a schematic cross sectional view along an offset gear axis of rotation of the actuation unit of FIG. 2, FIG. 10 a top view of an actuation unit according to a further embodiment with a parallelly spaced motor unit, FIG. 11 a top view of an actuation unit according to a further embodiment with a perpendicular motor unit, and FIG. 12 a perspective view of an actuation according to a further embodiment with a different first attachment device.

DETAILED DESCRIPTION

Figure 1:
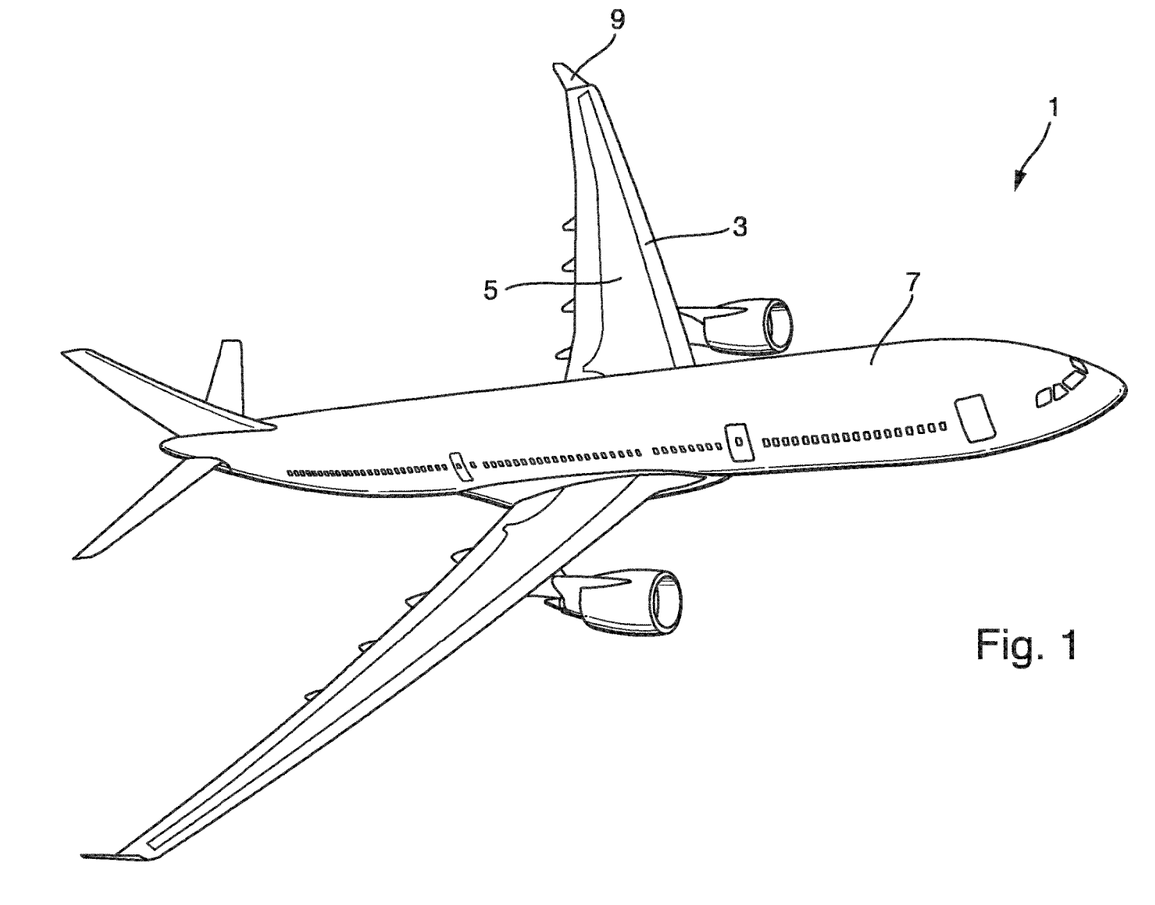

FIG. 1 shows an exemplary aircraft 1 according to an embodiment of the present invention. The aircraft 1 comprises a foldable wing 3 including a fixed wing 5 mounted to a fuselage 7, and a foldable wing tip portion 9 movably mounted to the fixed wing 5.

Figure 2:
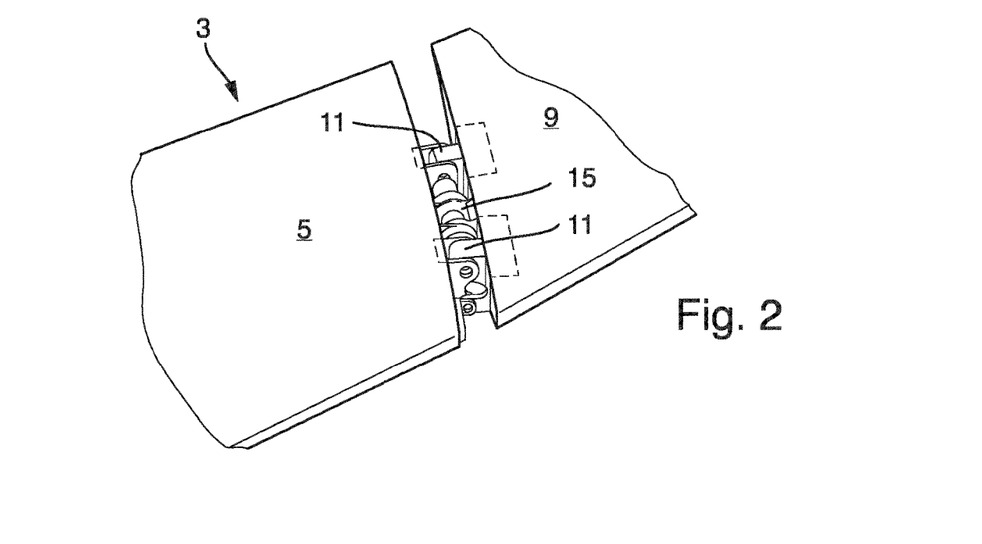
Figure 3:
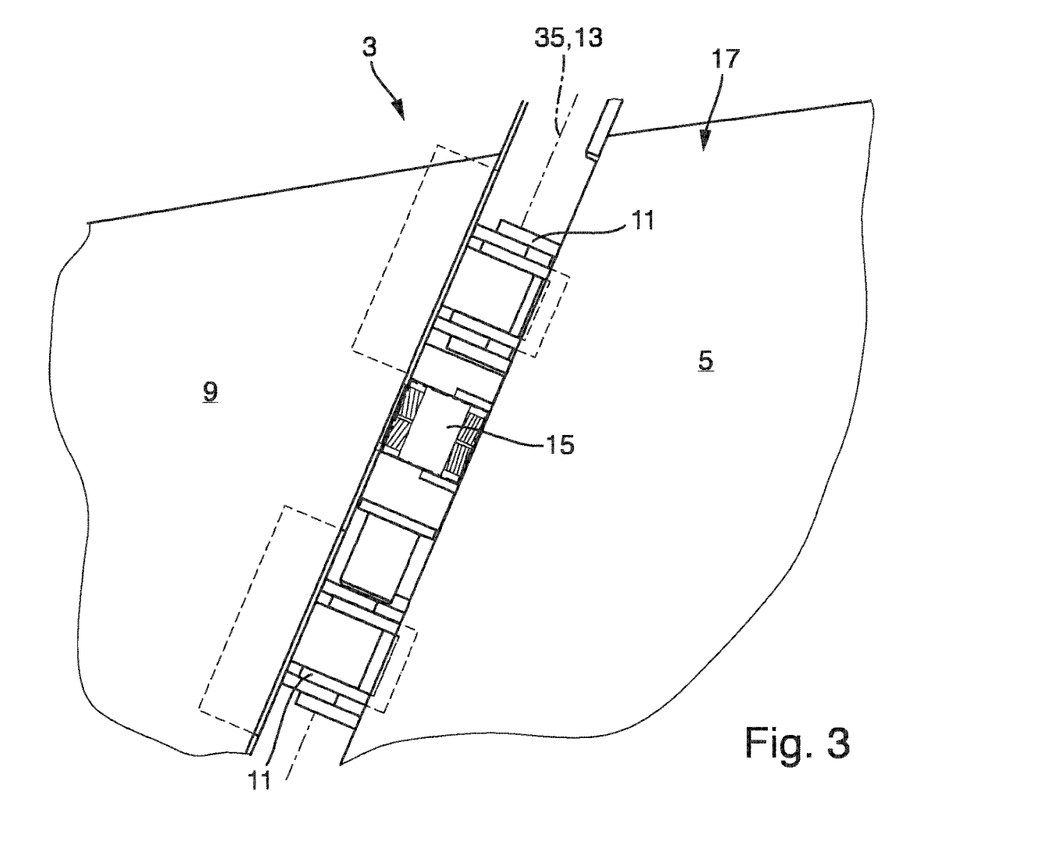

As shown in FIGS. 2 and 3, the wing 3 comprises a fixed wing 5, a foldable wing tip portion 9 mounted to the fixed wing 5 via hinges 11 rotatable about a hinge axis 13, and an actuation unit 15 for actuating movement of the wing tip portion 9 relative to the fixed wing 5, specifically folding upwards of the wing tip portion 9 relative to the fixed wing 5 about the hinge axis 13 extending in parallel to a horizontal plane and in parallel to wing surface 17.

As shown in FIGS. 4 to 7, the actuation unit 15 comprises a first housing part 19 and a second housing part 21. The first housing part 19 includes a first attachment device 23 attaching the actuation unit 15 to the fixed wing 5. The first attachment device 23 comprises three spherical joints 27 that are fixedly mounted to the first housing part 19 by brackets 29. The second housing part 21 includes a second attachment device 25 attaching the actuation unit 15 to the wing tip portion 9. The second attachment device 25 comprises one spherical joint 31 that is fixedly mounted to the second housing part 21 by bracket 33 opposite the first attachment device 23.

The second housing part 21 is connected to the first housing part 19 such that it is rotatable relative to the first housing part 19 about a main axis of rotation 35. The main axis of rotation 35 coincides with the hinge axis 13 of the hinges 11 movably connecting the wing tip portion 9 to a fixed wing 5. The actuation unit 15 is positioned on the main axis of rotation 35 between two neighboring hinges 11. The main axis of rotation 35 proceeds within a cross sectional extension of the actuation unit 15, when viewed across the main axis of rotation 35.

The second housing part 21 includes a toothed rack 37 having a concave shape and facing the main axis of rotation 35. The toothed rack 37 is fixedly mounted to the second housing part 21. Also, the toothed rack 37 is curved around the main axis of rotation by an angle of 94°. The actuation unit 15 further comprises a drive pinion 39 supported at the first housing part 19 and engaging the toothed rack 37 for driving the second housing part 21 rotatingly relative to the first housing part 19. A pinion axis of rotation 41 of the drive pinion 39 is spaced apart from and in parallel to the main axis of rotation 35. The drive pinion 39 is driven by a coupling arrangement 43 that is coupled to an output 45 of a motor unit 47, in the present embodiment an electric motor.

Figure 7:
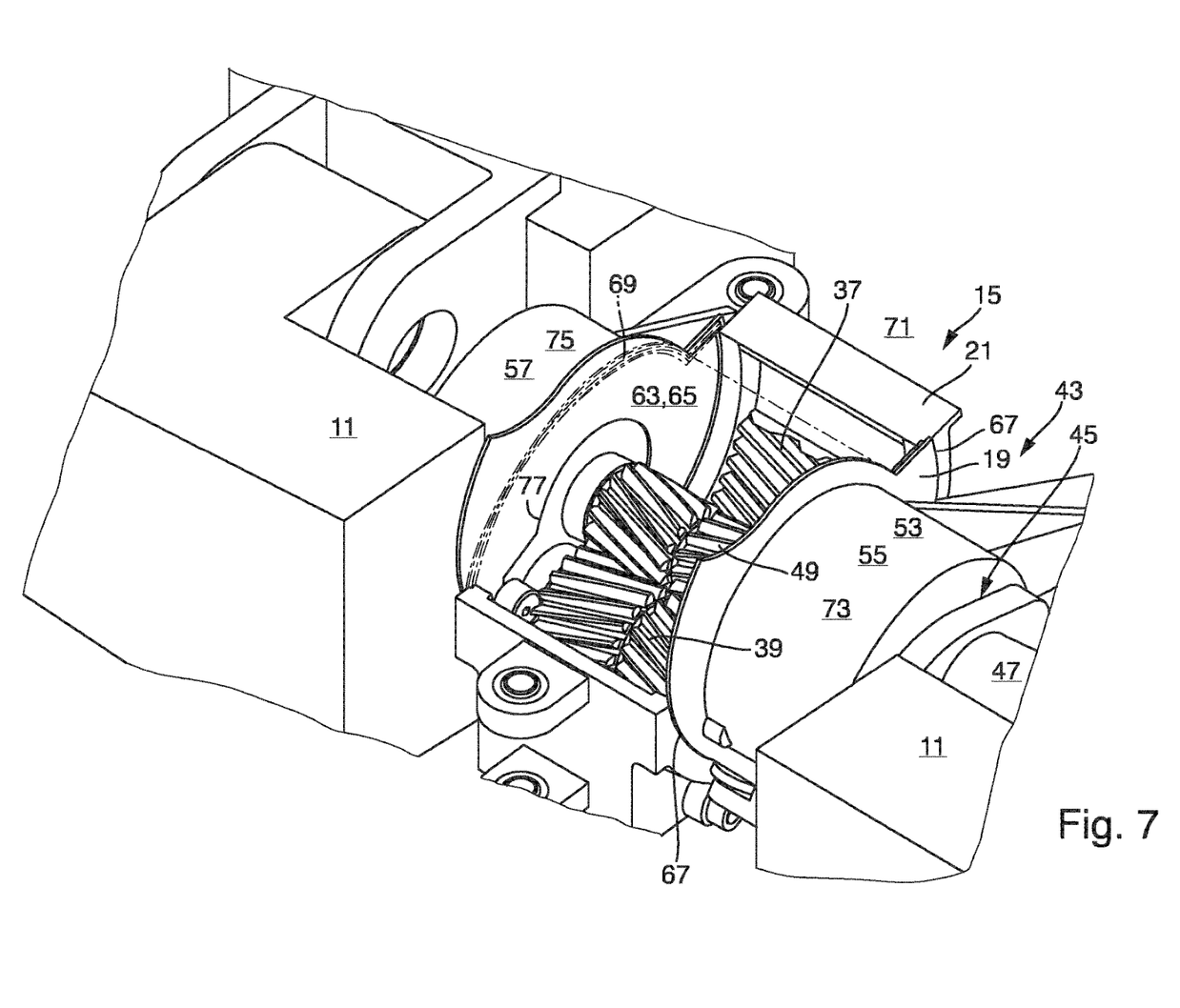
Figure 8:
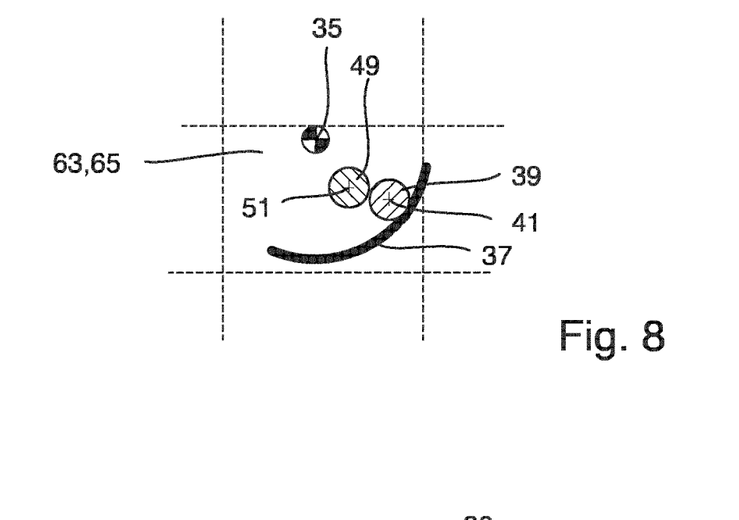
Figure 9:
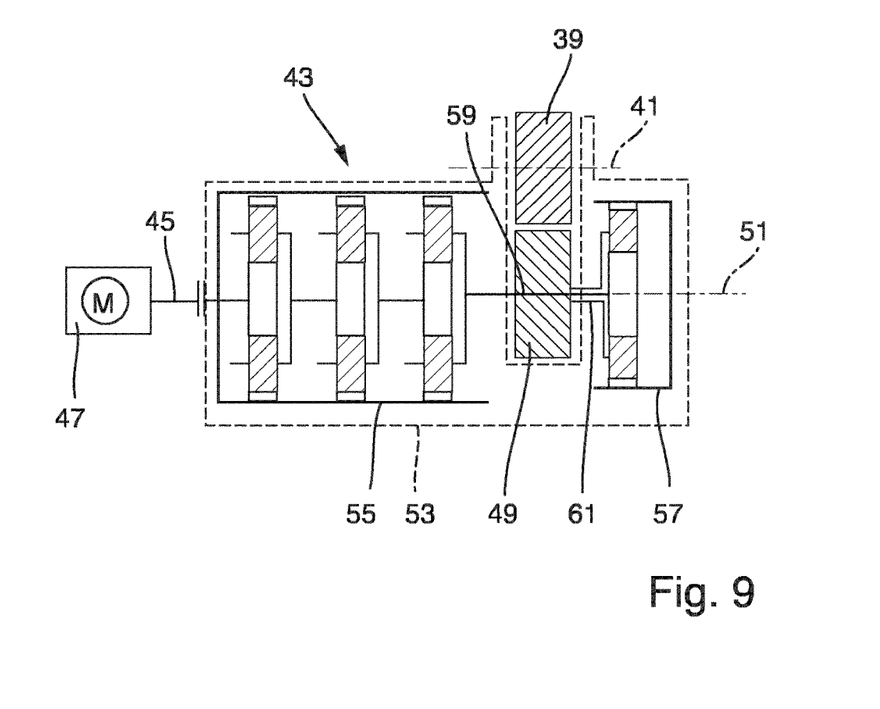

As shown in FIGS. 7, 8 and 9, the coupling arrangement 43 includes an offset gear 49 that drives the drive pinion 39 by engaging the drive pinion 39 at a position spaced apart from the toothed rack 37. An offset gear axis of rotation 51 of the offset gear is spaced apart from and in parallel to the main axis of rotation 35 and to the pinion axis of rotation 41.

As shown in FIG. 9, the coupling arrangement 43 further includes a gear assembly 53 configured to reduce rotational speed and increase torque in a direction from the motor unit 47 to the drive pinion 39. The gear assembly 53 is arranged in line with the offset gear 49, i.e. along the offset gear axis of rotation 51. The gear assembly 53 comprises a number of reduction stages 55 reducing rotational speed and increasing torque, and at least one power stage 57 further reducing rotational speed, increasing torque and being formed particularly stiff and strong for transferring the high torque to the offset gear 49. The reduction stages 55 are arranged on one side and the power stage 57 is arranged on the opposite side of the offset gear 49, when viewed along the offset gear axis of rotation 51. The reduction stages 55 are coupled to the power stage 57 by a drive through shaft 59 that axially proceeds through the offset gear 49 without being coupled to the offset gear 49. The power stage 57 is separately coupled to the offset gear 49 by a coaxial shaft 61 arranged coaxially with respect to the drive through shaft 59.

As shown in FIGS. 4 to 7, the first housing part 19 and the second housing part 21 together enclose an interior space 63. The interior space 63 is sealed to the environment. The drive pinion 39 and the offset gear 49 are arranged inside the interior space 63. A lubricant 65 is provided inside the interior space 63 to lubricate the toothed rack 37, the drive pinion 39 and the offset gear 49. Sealing lips 67 are provided between the first and second housing parts 19, 21 in order to seal the interior space 63 and keep the lubricant 65 from leaking. The second housing part 21 includes a cover 69 that is pivotable between a closed position where the interior space 63 is closed to the surrounding 71, and an opened position where the interior space 63 is opened to the surrounding 71.

Figure 4:
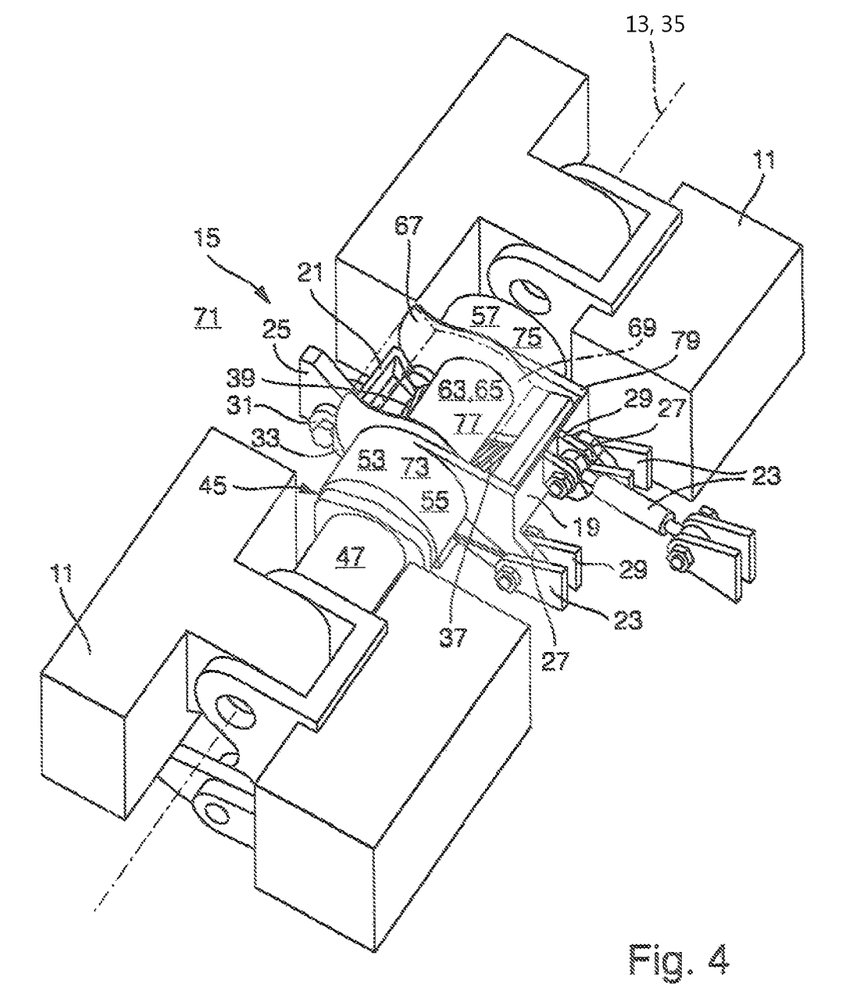
Figure 5:
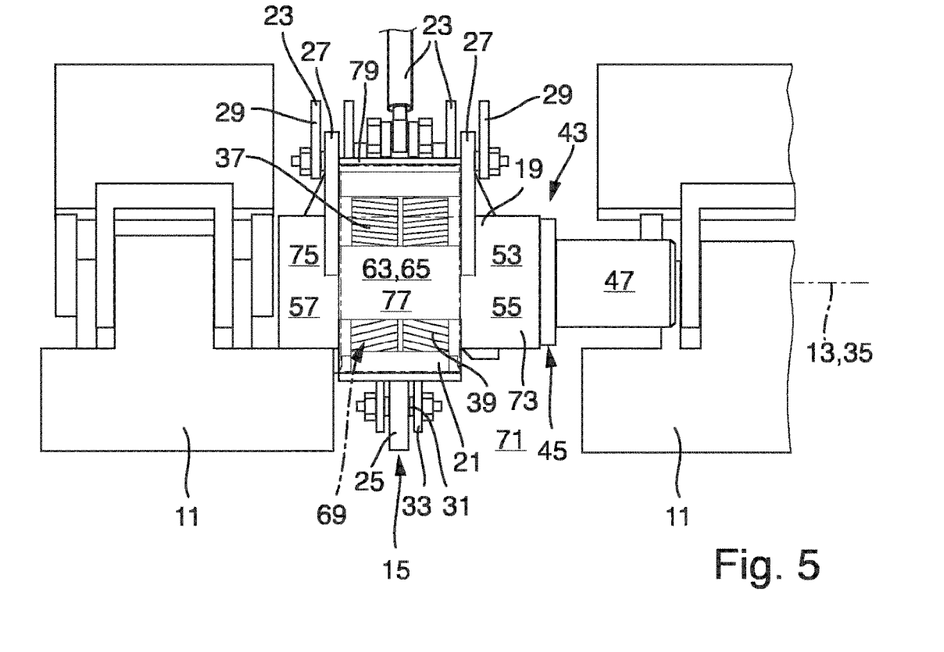

The first housing part 19 forms a circumferential first case 73 around the reduction stages 55 and a circumferential second case 75 around the power stage 57 of the gear assembly 53. As shown in FIGS. 4 and 5, the first case 73 and the second case 75 are connected to one another by a connection structure 77 transferring loads and torque between the first and second cases 73, 75. The connection structure 77 is arranged inside the interior space 63 and radially surrounded by the second housing part 21. The connection structure 77 is formed as a curved shell part extending in parallel to the main axis of rotation 35 and partially surrounding the offset gear 49. The first case 73 and the second case 75 are further connected to one another by a structure bridge 79 extending radially outwards to the second housing part 21, see also FIGS. 4 and 5. The structure bridge 79 also serves to transfer loads between the first and second cases 73, 75, and the first attachment device 23 is mounted to the structure bridge 79.

Figure 6:
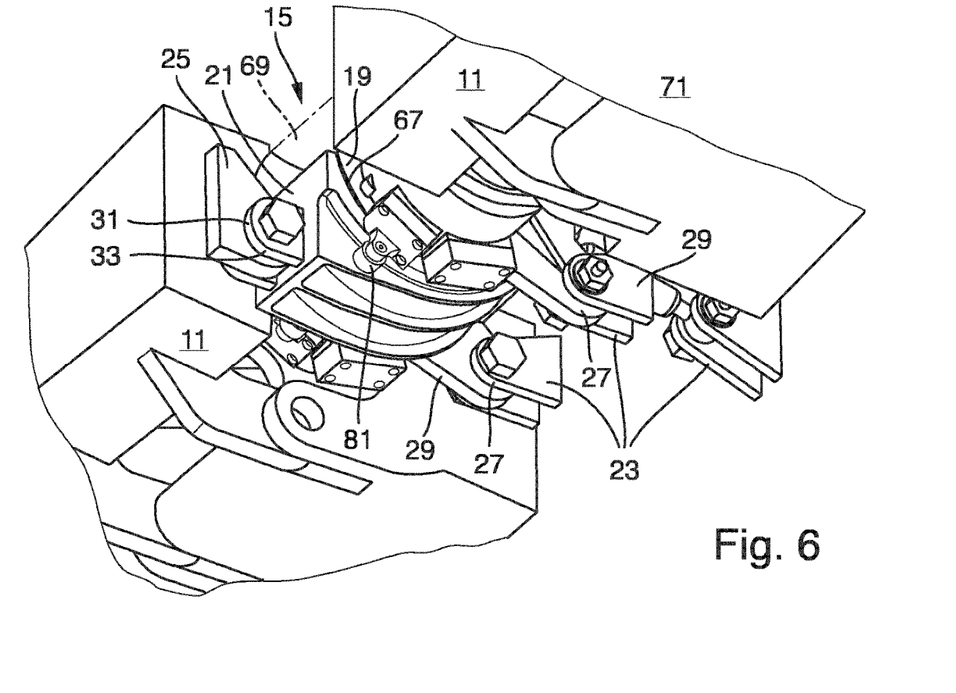

Further, as shown in FIG. 6, rollers 81 are mounted to the outside of the first housing part 19 and engaging the surface of the second housing part 21 for providing a defined and smooth path of movement for the second housing part 21 relative to the first housing part 19.

Figure 10:
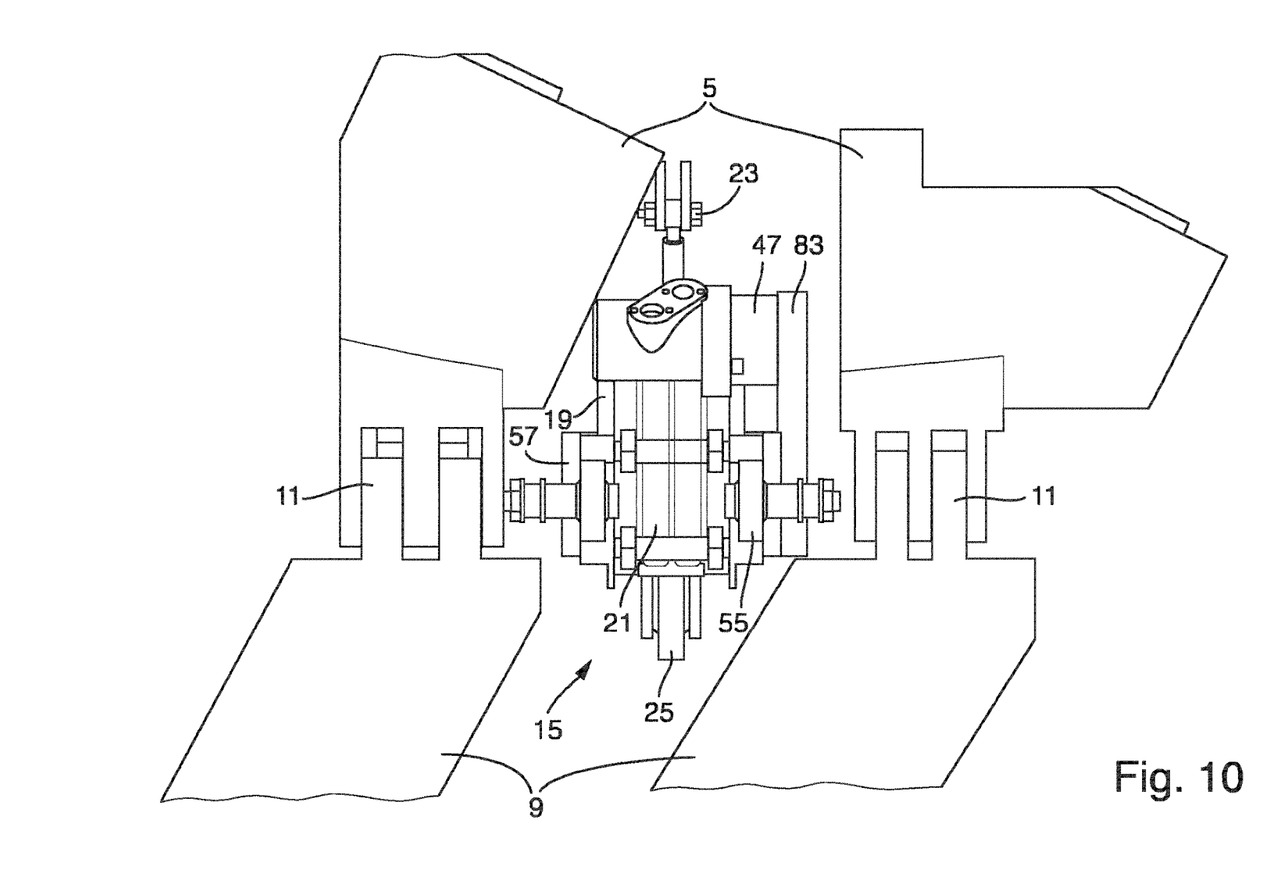
Figure 11:
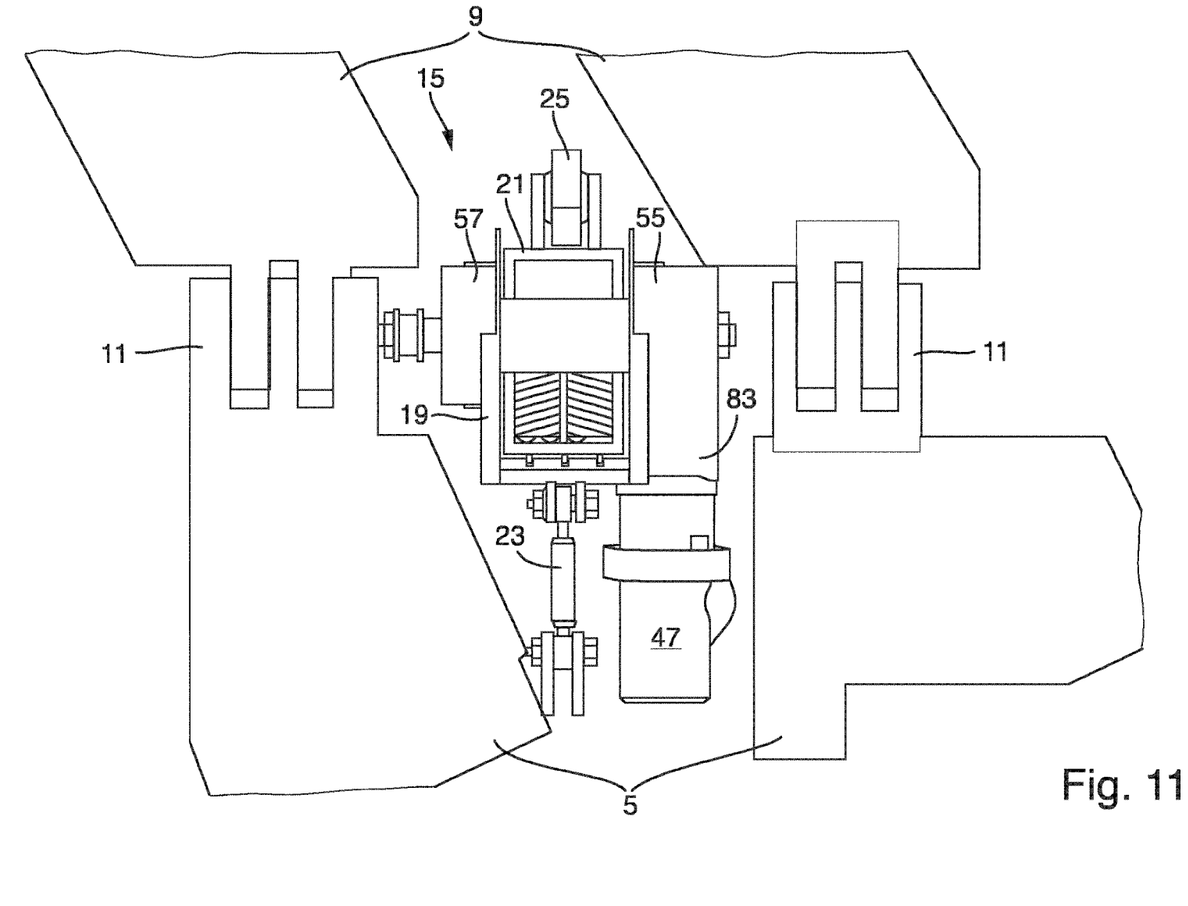

FIGS. 10 and 11 show two alternative embodiments of the actuation unit 15, wherein the gear assembly 53 comprises a connection gear stage 83 connecting the output 45 of the motor unit 47 to the reduction stages 55 when the output 45 is not aligned with the reduction stages 55. In the embodiment shown in FIG. 10, the motor unit 47 is arranged such that the output 45 extends parallelly, and spaced apart, from the reduction stages 55. In the alternative embodiment shown in FIG. 11, the motor unit 47 is arranged such that the output 45 extends perpendicularly to the reduction stages 55.

Figure 12:
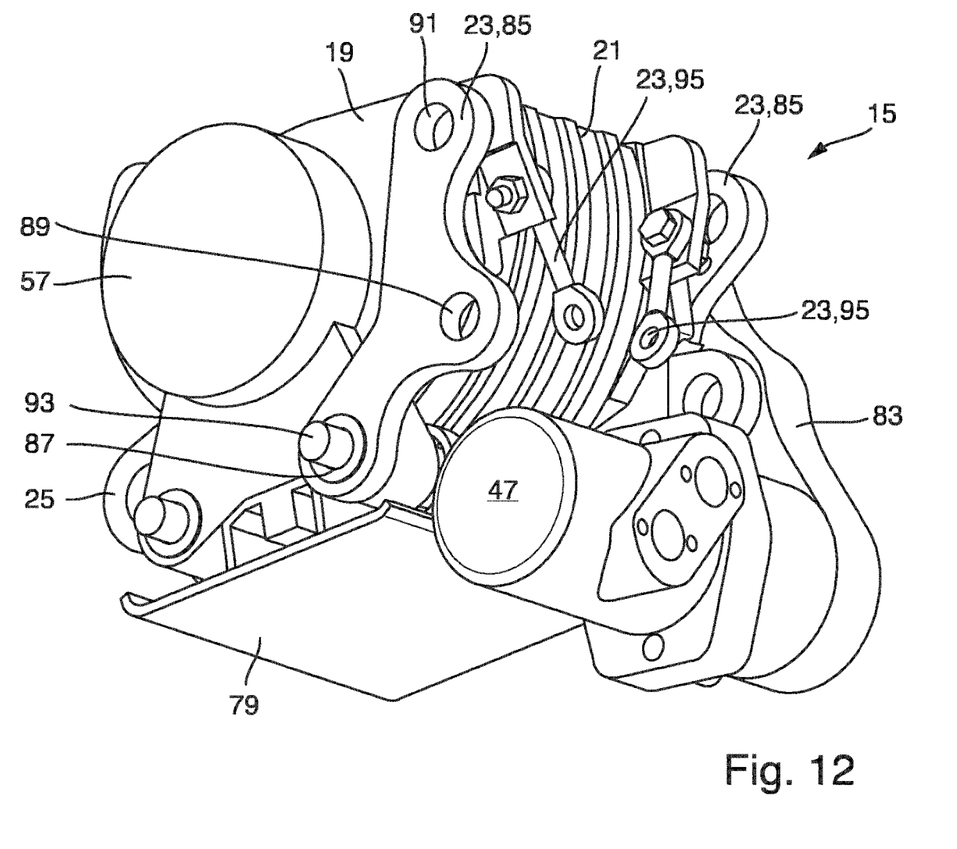

FIG. 12 shows an embodiment of the actuation unit 15 similar to the embodiment shown in FIG. 10 but with a different first attachment device 23. The first attachment device 23 comprises two plate-shaped attachment links 85 having three bores each 87, 89, 91. The attachment links 85 have a Y-shape wherein each bore 87, 89, 91 is provided in one of the three ends of the Y-shaped structure of the attachment links 85. The attachment links 85 are arranged on opposite sides of the first housing part 19 and can be mounted between the first housing part 19 and the fixed wing 5 by bolts. Specifically, each attachment link 85 is secured to the first housing part 19 by a first bolts 93 connected to the first housing part 19, extending through a first bore 87 in the attachment link 85, and is configured to be secured to the fixed wing 5 by two further bolts (not shown) connected to the fixed wing 5, extending through second and third bores 89, 91 in the attachment link 85. In addition to the attachment links 85 the first attachment device 23 comprises two opposite rods 95 bolted to the first housing part 19 and configured to be bolted to the fixed wing 5. The rods 95 are bolted to the first housing part 19 in a position radially spaced apart from the first bolts 93 connecting the attachment links 85 to the first housing part 19.

The invention claimed is:

1. An actuation unit for actuating a foldable wing tip portion of a wing for an aircraft, the actuation unit comprising:
 a first housing part including a first attachment device configured for attaching the actuation unit to a fixed wing for the aircraft, and
 a second housing part including a second attachment device configured for attaching the actuation unit to a wing tip portion foldably mounted to the fixed wing,
 wherein the second housing part is connected to the first housing part such that the second housing part is rotatable relative to the first housing part about a main axis of rotation,
 wherein the second housing part includes a toothed rack having a concave shape and facing the main axis of rotation,
 wherein the actuation unit further comprises a drive pinion supported at the first housing part and engaging the toothed rack for driving the second housing part rotatingly relative to the first housing part, and
 wherein the drive pinion is driven by a coupling arrangement configured to be coupled to an output of a motor unit.

2. The actuation unit according to claim 1, wherein the main axis of rotation proceeds within a cross sectional extension of the actuation unit.

3. The actuation unit according to claim 1, wherein the coupling arrangement includes an offset gear that drives the drive pinion by engaging the drive pinion at a position spaced apart from the toothed rack.

4. The actuation unit according to claim 1, wherein the coupling arrangement includes a gear assembly configured to reduce rotational speed and increase torque in a direction from the motor unit to the drive pinion.

5. The actuation unit according to claim 4, wherein the coupling arrangement includes a gear assembly configured to reduce rotational speed and increase torque in a direction from the motor unit to the drive pinion and the gear assembly is arranged in line with the offset gear.

6. The actuation unit according to claim 5, wherein the gear assembly comprises a number of reduction stages and at least one power stage.

7. The actuation unit according to claim 6, wherein the reduction stages are arranged on one side and the power stage is arranged on the opposite side of the offset gear, wherein the reduction stages are coupled to the power stage by a drive through shaft that axially proceeds through the offset gear without being coupled to the offset gear, while the power stage is separately coupled to the offset gear.

8. The actuation unit according to claim 7, wherein the second housing part includes a cover that is movable between a closed position where the interior space is closed to the surrounding, and an opened position where the interior space is opened to the surrounding, and
 wherein the first housing part forms a circumferential first case around the reduction stages and a circumferential second case around the power stage of the gear assembly, wherein the first case and the second case are connected to one another by a connection structure, wherein the connection structure is arranged inside the interior space and radially surrounded by the second housing part.

9. The actuation unit according to claim 6, wherein the gear assembly comprises a connection gear stage configured for connecting the output of the motor unit to the reduction stages when the output is not aligned with the reduction stages.

10. The actuation unit according to claim 1, wherein the first housing part and the second housing part together enclose an interior space, wherein the drive pinion is arranged inside the interior space.

11. The actuation unit according to claim 10, wherein a lubricant is provided inside the interior space to lubricate the toothed rack and the drive pinion.

12. The actuation unit according to claim 10, wherein the second housing part includes a cover that is movable between a closed position where the interior space is closed to the surrounding, and an opened position where the interior space is opened to the surrounding.

13. The actuation unit according to claim 1, wherein the toothed rack is curved around the main axis of rotation by an angle of at least 90°.

14. The actuation unit according to claim 1, wherein the first attachment device comprises one or more spherical joints, and wherein the second attachment device comprises one or more spherical joints.

15. A wing for an aircraft comprising
 a fixed wing,
 a foldable wing tip portion mounted to the fixed wing via hinges rotatable about a hinge axis, and
 an actuation unit according to claim 1, wherein the actuation unit is attached to the fixed wing via the first attachment device,
 wherein the actuation unit is attached to the wing tip portion via the second attachment device,
 wherein the hinge axis coincides with the main axis of rotation of the actuation unit, and
 wherein the wing further comprises a motor unit that has an output coupled to the coupling arrangement for driving the drive pinion.

16. The wing according to claim 15, further comprising a gear assembly including a connection gear stage configured for connecting the output of the motor unit to the reduction stages when the output is not aligned with the reduction stages,
  wherein the connection gear stage connects the output of the motor unit to the reduction stages, and the motor unit is arranged such that the output extends parallel to and spaced apart from the reduction stages.

17. The wing according to claim 15, further comprising a gear assembly including a connection gear stage configured for connecting the output of the motor unit to the reduction stages when the output is not aligned with the reduction stages,
  wherein the connection gear stage connects the output of the motor unit to the reduction stages, and the motor unit is arranged such that the output extends perpendicular to the reduction stages.

18. An aircraft comprising a wing according to claim 15.

19. An aircraft comprising:
  a fixed wing having a proximal end fixed to a fuselage of the aircraft;
  hinges attached to a distal end of the fixed wing and rotatable about a hinge axis;
  a foldable wing tip device supported by the hinges;
  an actuation unit including:
    a first housing part fixed to the fixed wing;
    a drive pinion supported by the first housing part;
    a second housing part fixed to the foldable wing tip device, wherein the second housing part includes a toothed rack having a concave shape and teeth facing the hinge axis;
    wherein the foldable wing tip device is configured to be pivoted about the hinge axis by rotation of the drive pinion which moves the toothed rack.

* * * * *